Oct. 18, 1938.  W. ROSETT  2,133,334
STABILIZED ABSORBENT SOLUTION FOR DEHYDRATING AIR
Filed Oct. 20, 1934  3 Sheets-Sheet 1

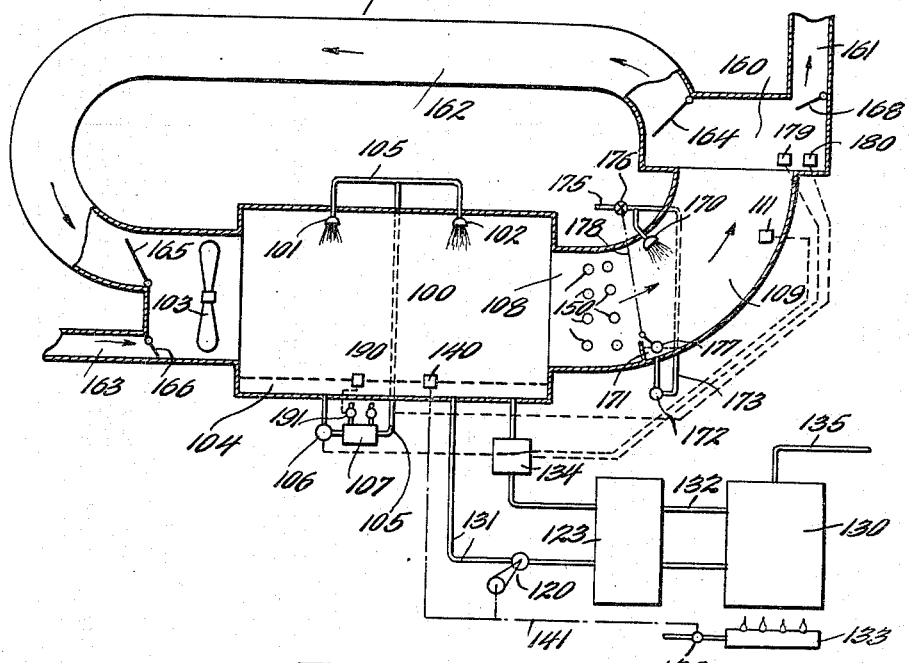
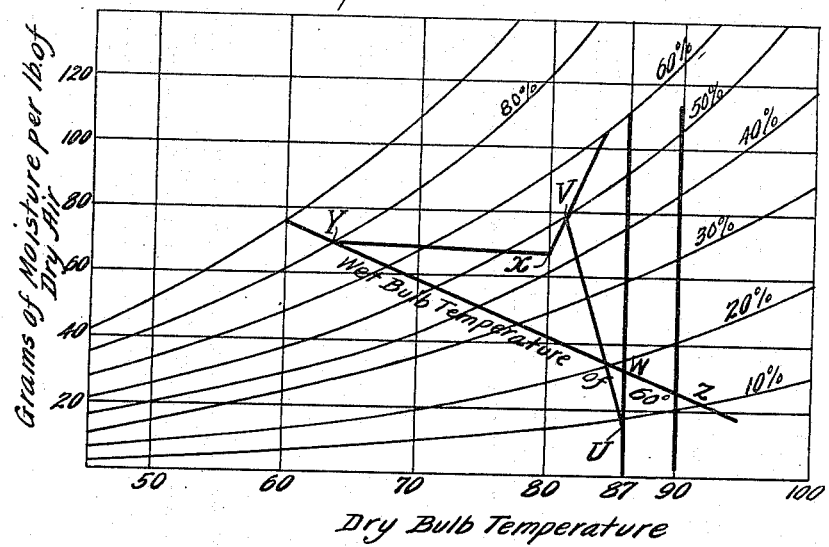

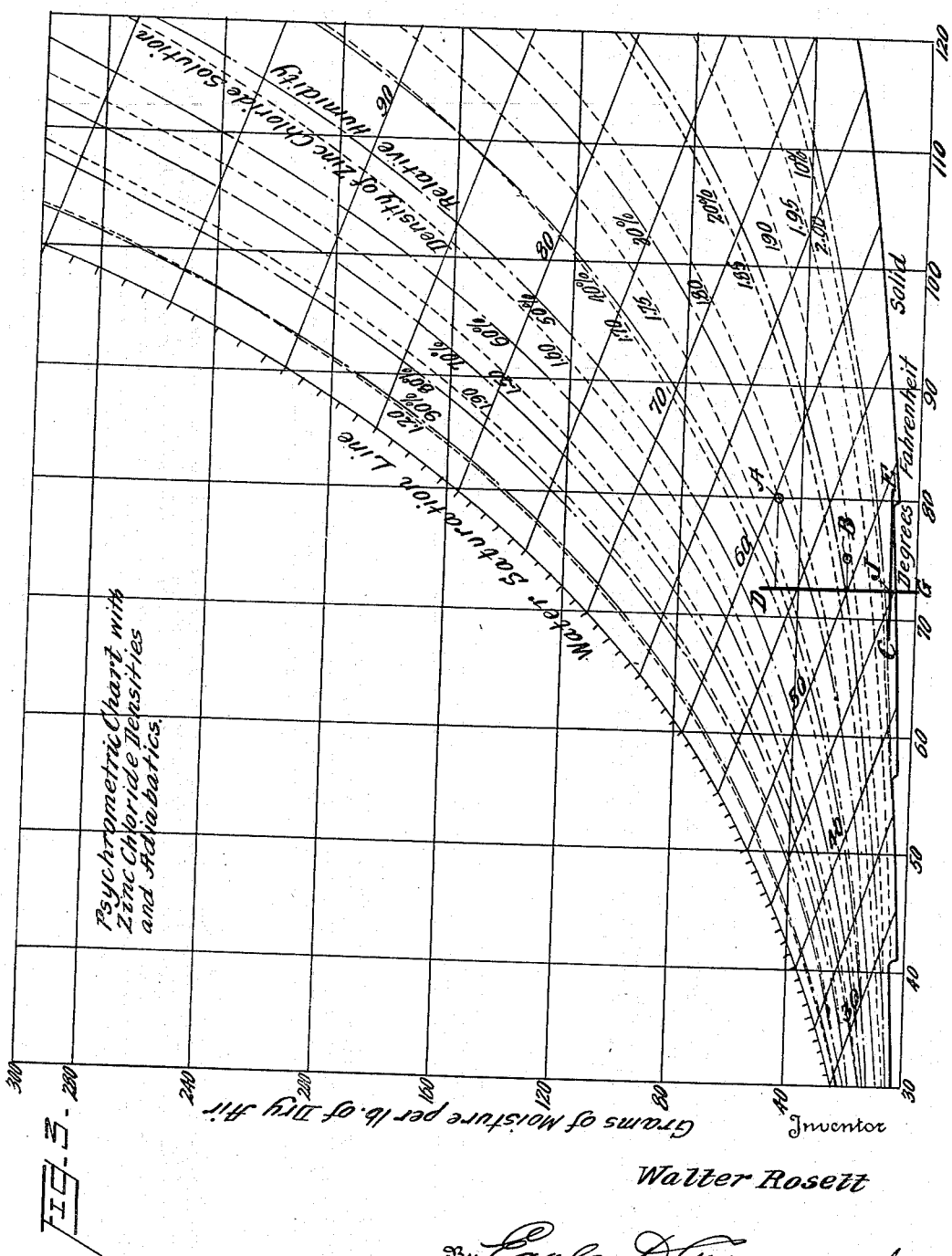

Patented Oct. 18, 1938

2,133,334

UNITED STATES PATENT OFFICE 2,133,334

STABILIZED ABSORBENT SOLUTION FOR DEHYDRATING AIR

Walter Rosett, Washington, D. C., assignor, by mesne assignments, to The Dow Chemical Company, Midland, Mich., a corporation of Michigan Application October 20, 1934, Serial No. 749,315

1 Claim. (Cl. 23—4)

This invention relates to the use of aqueous stabilized absorbent solutions in the treatment of air and more particularly in the use of water solutions of a highly water soluble zinc salt and of an alkali constituent for controlling the humidity of an air stream.

One of the objects of this invention is to provide an improved method of treating air whereby the temperature and water vapor content of the air may be controlled. Another object is to provide a stabilized solution, containing an alkaline constituent, which will not lose its acidic constituents on boiling or in contacting the air stream, and which will not act in a corrosive manner with respect to the metal parts of the air conditioning apparatus, and which will not precipitate solids while in use in the normal temperature range existing in the apparatus.

In carrying out the invention, it is contemplated to use as a medium for the control of the content of water vapor in air, a solution of one or more of the highly soluble salts of zinc, preferably the highly soluble halogen salts, zinc chloride, zinc bromide, or zinc iodide. These salts are used in an aqueous solution. The solutions are rendered more suitable for use in ordinary commercial apparatus by the addition of small amounts of from about 1% to about 3% of certain agents to reduce the acidity of the solutions and to render the solutions alkaline and more stable. For example, with solutions of zinc chloride, a stabilizing agent comprising about 1 or 2% of zinc oxide, or about 1% ammonium hydroxide may also be used so that in a volume of the solution containing a gram mole of soluble salt, the alkalinity is such that when said volume of solution is diluted with cold water, and then titrated with acid, .005 of a mole of acid or more is required to render the solution acid to an acid indicator such as methyl orange. The addition of certain ammonium salts such as ammonium chloride and salts of soluble amines in general increases the power of the solution to hold the alkaline stabilizing agents in solution. The addition of more than a certain amount is found to increase the temperature at which solid separates from a cooled solution. It is therefore preferable that the amount of stabilizing solution be limited to such an amount as will not cause precipitation of solid at the lowest operating temperature which is contemplated.

Further objects and advantages of the invention will be apparent from the following description, reference being had to the accompanying drawings forming part of this specification and wherein a preferred form of the present invention is clearly shown.

In the drawings:—

Fig. 2 is a diagrammatic view of an apparatus making use of the invention.

Fig. 3 is a psychrometric chart on which are drawn in a different form the same data as shown in Fig. 1, the chart being marked to show an application of the invention to a specific condition.

Fig. 4 is a psychrometric chart with an indication thereon of a mode of operation of the invention.

Figure 1:
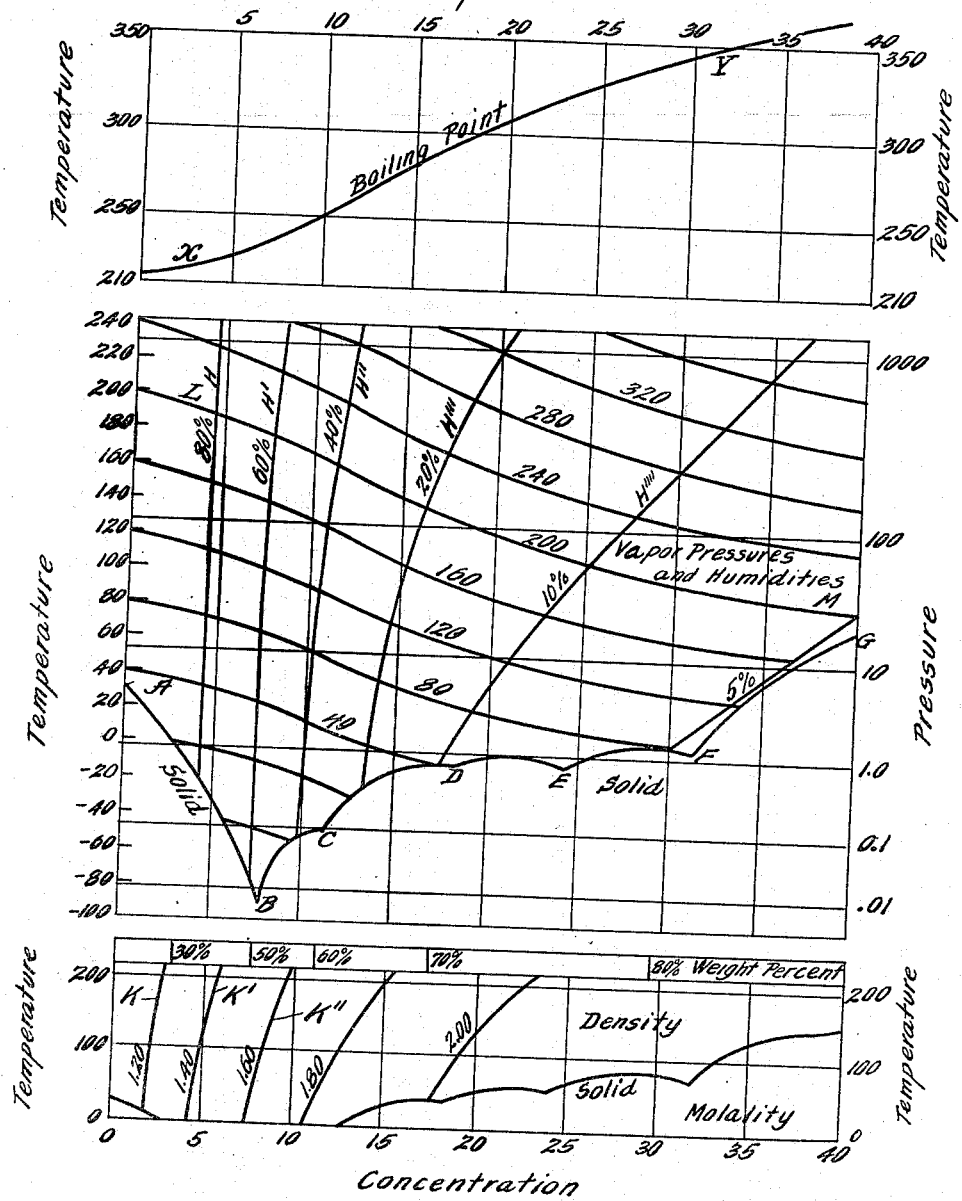
Fig. 1 is a chart indicating certain properties of zinc chloride as the dehydrating agent of the invention.

The chart illustrated in Fig. 1 of the accompanying drawings shows the water vapor pressure of stabilized zinc chloride aqueous solutions at various degrees of concentration and temperature. In the auxiliary charts of Fig. 1, above and below the main chart, are shown the boiling points of stabilized water solutions of zinc chloride and the densities of various stabilized water solutions of zinc chloride at varying degrees of concentration and temperatures. In the chart, lines AB, BC, CD, DE, EF, and FG indicate the lower limits of temperature and limits of concentration within which the solution is available for use as a gas conditioning agent without causing separation of solid salts from the water or without causing separation of ice. The lines LM, etc., indicate the water vapor pressure at the constant temperatures indicated and at varying concentrations as scaled on the bottom of the chart. The lines H, H', etc. indicate the relative humidity of air in equilibrium with solutions of various concentrations and at various temperatures. The vertical scale, on the right hand side of the chart, indicates logarithmically the vapor pressure of water of the solutions measured in millimeters of mercury. The lower horizontal scale, having numbers followed by the percent symbol, indicates concentration of the solutions in weight percent of anhydrous zinc chloride, while the scale having numbers without percent symbols indicates moles per 1000 grams water computed as zinc. The curves ABCDEFG represent the temperature and concentration at which this hydrated salt of zinc chloride with the amount of water indicated by the attached symbol would separate from the solution. It has been found that for the amount of stabilizing agent used mixed salts do not normally separate on cooling the solution. Curve AB indicates the temperatures and concentration at which ice would begin to separate from the solution. Curve XY shows the boiling point indicated by the figures at the right and left of the chart of solutions of concentration indicated by the concentration scale at the bottom of the chart. In that portion of the chart of Fig. 1 below the concentration scale and below the main chart, the lines K, K', K'', etc., indicate the density of stabilized zinc chloride solution at the concentration shown at the bottom of the chart and at temperatures indicated separately on the right and left of the chart.

Fig. 2 indicates an apparatus in which stabilized zinc solutions may be used to control the water vapor content in air.

In the apparatus of Fig. 2, a conditioning zone wherein the air is contacted with the stabilized solutions is defined by the chamber 100 connected by suitable conduits with the enclosure where the air is used. Circulation of the air through zone 100, in the direction shown by the arrows, is obtained by the fan 103, and contact of the air with the stabilized solutions is obtained in zone 100 by spraying the solutions into the air, or in any other well known manner. A sump 104 at the bottom of the conditioning chamber collects the stabilized solutions after having contacted with the air passing through the chamber. From the sump 104, the solution is recirculated by the pump 106, pipe 105 and nozzles 101 and 102. In this recirculation, the liquid may be heated or cooled, as desired, by means of the heat interchanger 107. Suitable control devices 111, responsive to humidity or temperature or other changes in the air may be employed to control the circulation of the liquid in accordance with desired conditions. These controls may be placed in contact with the air leaving the zone 100 through the port 108, or may be placed elsewhere in the system.

A regenerating system 130 is shown connected with the sump 104 by pipes 131 and 132. A pump 120, preferably motor driven, serves to draw a portion of the solution from the sump 104 and deliver it by pipe 131 to the regenerator from which the liquid after concentration is returned to the sump by pipe 132. The flow of liquid from the sump through the regenerating system may be controlled by a suitable control device 140 within the conditioning chamber and connected, as shown at 141, with the pump motor or other means controlling flow of the liquid in the circuit. The regenerator 130 may consist of a boiler with the heater 133 or other means of removing absorbed vapors in the solution, or it may consist of a means for adding water or other vapors to the solution, or it may consist of any means for changing the condition of the solution being circulated in respect to composition of any of the constituents. The heat exchanger 123 serves to transfer heat from the pipe 131 to pipe 132, and a heater or cooler 134 may be provided to transfer heat to or from pipe 132. The heater 133 illustrated in the preferred embodiment serves to boil or heat the liquid in the reconditioning system 130, and a vent 135 removes moisture or other vapors or substances removed in the reconditioning phase. A control element 136 for the heater or its burner is connected for actuation by the control 140. Temperature responsive control devices 179 and 180 control the cooling or heating media supplied to the coolers 107 and 134.

The air passing from the contact zone 100 through the port 108 may be further heated and cooled by the heating or cooling means 150, the air being then delivered by duct 109 to the space 160 in which it is used. A portion of the air may be discarded through the duct 161, a portion may be returned to the contacting zone 100 by way of the duct 162, and a duct 163 may be provided for introducing air other than that recirculated through the duct 162. Dampers 168, 164, 165 and 166, are provided for controlling the flow of air through the various ducts.

The air being treated may be subjected to an auxiliary water spray, from nozzle 170, in its passage through the conduit 109. A source of water 175 controlled by the valve 176 furnishes water for the spray. A collecting sump 171, the recirculating pump 172 and pipe 173 serve to collect and return for reuse that portion of the spray which does not evaporate. A float 177 and connection 178 control the operation of valve 176. A damper controlled by-pass, not shown, may be provided so that only a portion of the air passes through the water spray.

In the operation of my invention, the conditions of concentration and temperature of my liquid drying agents are maintained in accordance with the conditions of temperature and humidity desired in the conditioned air, and in accordance with the amount of vapor to be removed from said air, and in accordance with the amount of heat to be removed from said air. The desired temperature of the liquid agents is maintained in the embodiment described by regulating the amount of heating or cooling applied to the liquid agents through the interchanger 107, and the degree of concentration of the liquid agents desired is maintained by regulating the amount of water removed from the agents by regulating the amount of heat supplied through the burner or heater 131 by means of the valve 136. It is readily understood that the schematic illustration in Figure 2 does not represent the parts in their true relative dimensions but is merely intended to be illustrative of a system for utilizing the principles of the invention.

As an example of the mode of choice of temperature and concentration conditions of the drying agents, it may be assumed that it was desired to maintain the vapor or air leaving the zone 100 at a relative humidity of 18% and a temperature of 75 degrees F. The rate of flow of air through the contacting zone is such that air passing through will suffer a reduction in moisture content that is one-third of the reduction that would occur if the air were brought into equilibrium with the drying agents. The surfaces and design of the tower are such that the temperature of the air leaving the zone 100 will fall two-thirds of the way toward the temperature of the liquid solution. In the example assumed, the inlet air has a temperature of 80° F. and a relative humidity of 30%.

Reference is now had to a psychrometric chart of usual form illustrated in (Fig. 3 of) the drawings, wherein the solid curved lines represent the relative humidity of air in equilibrium with the solution of zinc chloride and the dotted curved lines are those of zinc chloride solutions of constant density. The vertical lines are lines of constant temperature and the horizontal lines are lines of constant vapor pressure. The slant lines of the chart are lines of constant heat for the process of evaporating water from the solution into air. The conditions of temperature and density corresponding to a solution at equilibrium with the inlet air are found to be temperature 80° F., density 1.78, see chart of Figure 3, point A. The desired condition of the outlet air corresponds to a temperature and concentration at equilibrium of the solution of 75 degrees F. and density of 1.89 shown on the chart as point B. Since with the tower structure in the example described, the partial vapor pressure of the air is reduced 2/3 of the way toward the equilibrium vapor pressure of the solution, the vapor pressure of the solution used must be along a horizontal line CE of constant vapor pressure so placed that the vertical distance to A is three times the vertical distance to B. Since in the structure of the example the temperature of the air falls 2/3 of the way toward the temperature of the inlet air, the temperature of the solution must be along a vertical line GD of constant temperature so placed that the horizontal distance to A is three times the horizontal distance to B. The intersection of the line GD with the line EC is at J. In order, therefore, to maintain the desired condition of the outlet air with the structure illustrated, it is necessary to use solutions of the density and temperature and concentration corresponding to the point J on the chart, namely, the temperature of 72½° F., a relative humidity of 8%, and the density of 2.06. The conditions just set forth lie entirely outside of the range in which calcium chloride solutions and lithium chloride solutions may be employed as liquid drying agents for gas or air, or for the economical use of existing equipment used to produce comfort conditions in an enclosed space.

Another example of the use of the stabilized solutions of this invention which is outside of the range wherein drying solutions of calcium chloride and lithium chloride may be employed is as follows: Assume that the available cooling means limits the temperature of the liquid drying agents to 87° F. It is desired to deliver air at a temperature of 63° F. and a relative humidity when heated to 80° F. of 44%. The inlet air has a temperature of 81° F. and a relative humidity of 50%. The tower contacting chamber employed is the same as in the preceding example. By reference to the chart in Fig. 1 or Fig. 3, it will be seen that there are no possible conditions of temperature and concentration for the solution which will give air at these conditions. In this event, I employ an auxiliary spray of water shown in Fig. 2 at 170. By evaporation of this water, the air in which it evaporates will be cooled and rehumidified. By properly proportioning the fineness of spray, and the amount of water, a range of humidities and temperatures can be imparted to the air so treated, all lying along or near to the line of constant wet bulb as shown on a psychrometric chart. Referring now to Fig. 4, the point X in the chart corresponds to the desired temperature and humidity of the air. If the final air is to have condition corresponding to point Y, and if that condition is to be obtained by the evaporation of water, the initial air leaving the contacting zone 100 of Fig. 2 must have a temperature and humidity corresponding to some point on the line of constant bulb YZ, for when water is evaporated into air without addition of heat, the temperature of the air falls and the humidity rises in such a way that the wet bulb of the air remains constant. With the temperature of the liquid drying medium at 87° F., and with the return air to the dryer having an inlet temperature of 81° F. and humidity of 50% as in the example, the outlet air from the zone 100 must have a temperature 2/3 of the way from 81° F. to 87° F., namely, a temperature of 85° F. The conditions of the air leaving the contact zone 100 must, therefore, correspond to the conditions at the intersection of the lines YZ and the line of temperature of 85° F. Since in the tower utilized, the air passing through the zone 100 must have its moisture content reduced 2/3 of the way toward that of air at equilibrium with the solution, and, since the solution has a temperature of 87° F., the water content of air in equilibrium with the solution must lie on the line connecting the point V and the intersection of the line YZ with the line of 85° F., namely, the line VU. The line of 85° F. cuts the line YZ at 2/3 the segment UV. By reference to Fig. 1, it will be found that the concentration of solution necessary to give equilibrium conditions corresponding to the point U a relative humidity of 9% and a temperature of 87° F. will be 74% concentration and these conditions of humidity and temperature cannot be obtained by either lithium chloride solution or calcium chloride solutions.

In order to maintain the solutions at the appropriate conditions of temperature and concentration, as desired in the particular application, I may employ any of the well known means. For an example, to obtain solutions of the correct concentration, I may maintain these solutions at a density and temperature corresponding to the desired humidity and temperature, by controlling the temperature of the solution and also the density of the solution by means of devices responsive to changes in the density and to changes in the temperature which devices actuate means for supplying heat to the solution or for supplying or abstracting moisture from the solution. For a more particular example, I may employ a thermostat 190 in contact with the solution, said thermostat actuating a valve 191 controlling the supply of heat or cold to the heater or cooler 107. I may employ a device sensitive to changes in density, that is to say, a density-stat 140 which density-stat controls by connection 141 the heating means, for example, the control of fuel, to the heater 133 by the valve 136.

While the invention is hereinabove described in connection with a preferred embodiment, it is to be understood that the words which have been used are words of description rather than of limitation and that changes within the purview of the appended claim may be made without departing from the true scope and spirit of the invention in all of its aspects.

I claim:

A method of adjusting the humidity of air that comprises treating an aqueous solution of zinc chloride with as much zinc oxide as can be used without causing subsequent precipitation of zinc compounds, together with ammonium chloride for inhibiting precipitation, bringing the solution into intimate contact with the air to be treated, and readjusting the concentration of the solution to compensate for the transfer of moisture between the air and the solution.

WALTER ROSETT.